J. B. HEALEY & H. E. McKINLEY.
AUTOMOBILE INDICATOR AND SIGNAL.
APPLICATION FILED JAN. 5, 1915.
1,164,514.
Patented Dec. 14, 1915.
2 SHEETS—SHEET 1.
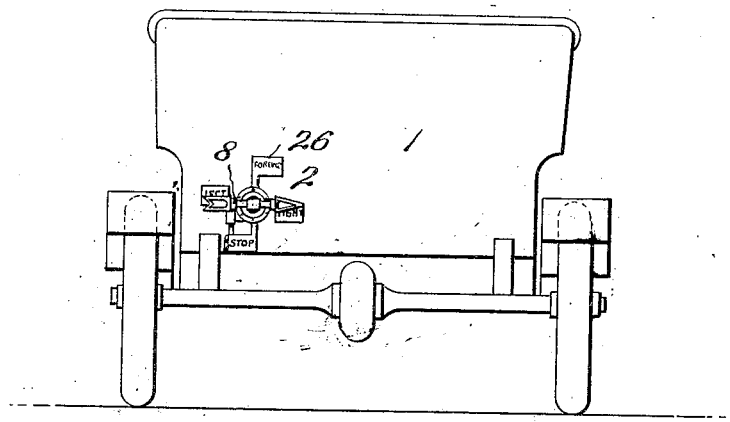
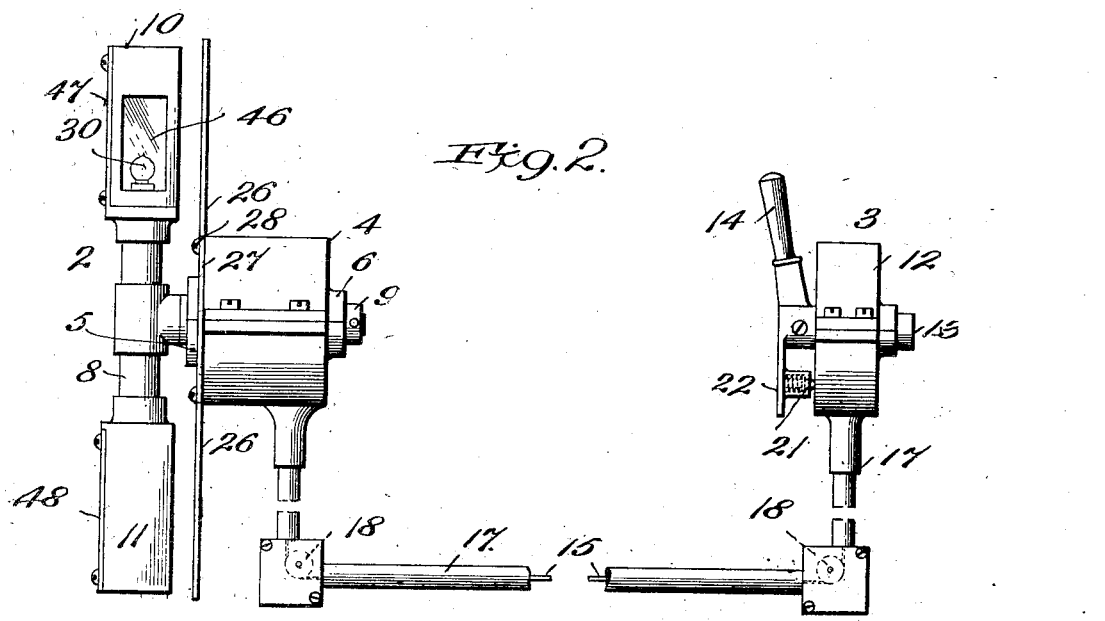
Inventor
J. B. Healey +
H. E. McKinley, J. B. HEALEY & H. E. McKINLEY.
AUTOMOBILE INDICATOR AND SIGNAL.
APPLICATION FILED JAN. 5, 1915.
1,164,514.
Patented Dec. 14, 1915.
2 SHEETS—SHEET 2.
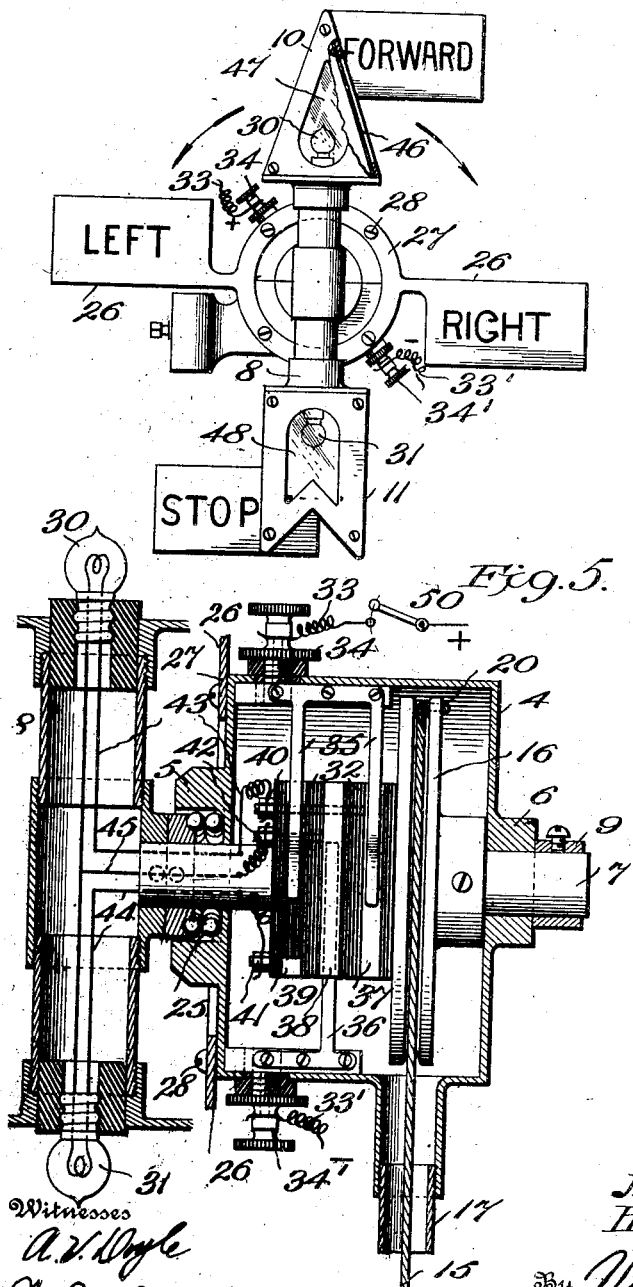
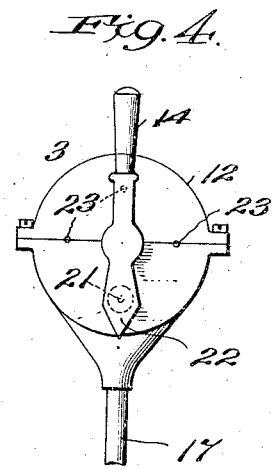
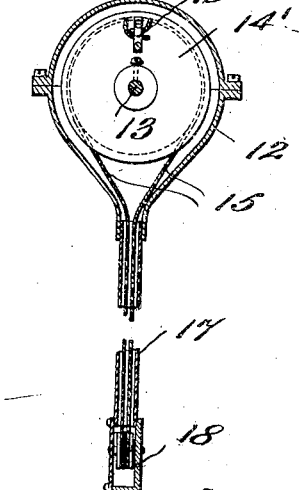
Witnesses
A. V. Doyle
H. E. Laughlin
Inventors
J. B. Healey &
H. E. McKinley,
By Victor J. Evans
Attorney

UNITED STATES PATENT OFFICE.

JOSEPH B. HEALEY AND HENRY E. McKINLEY, OF BROOKLYN, NEW YORK.

AUTOMOBILE INDICATOR AND SIGNAL.

1,164,514.  Specification of Letters Patent. Patented Dec. 14, 1915.

Application filed January 5, 1915. Serial No. 644.

*To all whom it may concern:*

Be it known that we, JOSEPH B. HEALEY and HENRY E. MCKINLEY, citizens of the United States, residing at Brooklyn, in the county of Kings and State of New York, have invented new and useful Improvements in Automobile Indicators and Signals, of which the following is a specification.

The general object of this invention is to improve the construction of vehicle signals in point of providing the rear lamp of the vehicle with a movable indicator so that a vehicle may be provided with a means whereby the driver of the vehicle may signal at night as well as by day the progressive movement of his vehicle, to the drivers of following vehicles. And to this end the invention consists broadly of a rotatable signaling arm in the ends of which are mounted electric lamps and in providing a means for manually operating the signaling arm and for controlling an electric circuit for illuminating the lamps, so that at night one of the lamps may be constantly illuminated for use as a tail lamp and the other of the lamps may be flashed when the signaling arm is actuated for attracting attention to the signal.

Other objects will appear and be better understood from that embodiment of our invention of which the following is a specification, reference being had to the accompanying drawings forming part hereof in which:—

Figure 1 is a rear elevational view of a vehicle shown equipped with the signaling device. Fig. 2 is a detail side elevational view of the signaling device. Fig. 3 is an enlarged rear elevational view of the device. Fig. 4 is a front elevational view of a portion of the device located adjacent the driver of a vehicle. Fig. 5 is an enlarged vertical sectional view of a portion of the device which is located on the rear of the vehicle, and Fig. 6 is a vertical sectional view of a portion of the device which is located adjacent the driver of a vehicle.

Referring to the drawings in detail 1 indicates the body of an automobile to the rear end of which is mounted the signaling portion 2 and on the front portion of which is adapted to be secured the operating portion 3 of the present invention.

The signaling portion is secured on the automobile body by any suitable means, at a position where it may be distinctly visible to those in the rear thereof, and comprises a casing 4 in the ends of which are arranged bearings 5 and 6 for supporting a horizontally arranged rotatable shaft 7. The outer end of the shaft projects beyond the end of the bearing 5 so as to have suitably secured thereon a signal member 8 and the inner end of the shaft projects beyond the end of the bearing 7 so as to have suitably secured thereon a locking collar 9 for preventing any lateral movement of the shaft when the device is in use.

The signal member is preferably formed of a hollow structure into substantially the shape of an arrow and is provided with the enlarged tapering headed portion 10 and the enlarged tail portion 11. The arrow is adapted to be rotated either to the right or left and its movements at all times are normally under perfect control of the driver of the vehicle to which the device is attached.

Any suitable means may be employed for actuating the arrow which means may be located on the front portion of the vehicle at a position where it may be within convenient reach of an operator.

It is preferred to employ the means shown on the drawings for operating the arrow which comprises a casing 12 for supporting a horizontally arranged shaft 13, on the end of which is securely mounted an operating handle 14. The casing may be secured by any suitable means at a position on the front portion of the vehicle at a point where the operating handle may be within convenient reach of the driver of the vehicle. Arranged within the casing and keyed or otherwise suitably secured to the shaft 13 is an enlarged sheave 14' around which is trained a cable 15 which is provided for connecting the operating handle with the signaling portion of the device so that when the operating handle is actuated the arrow may be turned to indicate the direction which the vehicle is about to take. The cable after being trained around the sheave 14' is then carried to the rear of the vehicle and trained around an enlarged sheave 16 which is keyed or otherwise suitably secured on the shaft 7 of the signal arm.

A suitable protector in the form of tubing 17 connecting the operating and signaling portions of the device, and through which the cable passes, is provided for protecting the cable and for reducing any liability of the same from becoming interfered with when the device is in use. A series of idler sheaves 18 are arranged within the angular portions of the protector and around these sheaves the cable is passed as shown.

By means of a clamping strip 19 as indicated in Fig. 6 the ends of the cable are securely held on the sheave 14' and by means of the cable being fastened to the sheave 16 by being directed through openings in the sides of the sheave as indicated at 20 the cable is prevented from slipping on the sheaves or being otherwise displaced when the device is operated. A suitable locking means in the form of a spring pressed finger 21 (see Figs. 2 and 4,) is provided for normally retaining the signaling arm in any of its four signaling positions. This finger is mounted on a projection 22 secured to the lower end of the handle 14 and the outer end of the finger is arranged to engage in any one of a series of depressions or indentations 23 formed in the outer face of the casing 12.

To render more easy the operation of the signal arm a suitable ball bearing is provided and arranged in the outer end of the casing 4 as indicated at 25 in Fig. 5.

To facilitate the reading of the signals as they are given by the arrow, four arms are provided on which are arranged the signal terms "Forward", "Stop", "Right" and "Left". These arms are radially mounted on a plate 27 which by means of screws 28 is secured to the front face of the casing 4 at a point directly behind the arrow.

It is obvious by the structure just described that such a signaling device may be suitably employed for indicating the progressive movements of the vehicle during the day time but that if the device is to be utilized at night a suitable illuminating and signaling means must also be employed. Mechanism has been devised whereby the device may be utilized at night as well as by day and such mechanism is clearly illustrated in Figs. 3 and 5 of the drawings. Suitable electric lamps 30 and 31 are carried by the arrow and mounted respectively in the head and tail portions as shown. The lamp 30 is designed to be utilized as the tail lamp of the vehicle and at night when the electric circuit is switched on to the wires leading to the lamps, the tail lamp burns constantly. A circuit closure in the form of a commutator 32, rigidly mounted on the shaft 7, permits the constant illumination of the tail lamp 30 during the operation of the arrow. The lamp 31 is designed so as not to be illuminated until the arrow has been turned either to the right or left from its vertical or forward indicating position, thus upon the turning of the arrow the flash of this lamp is designed to attract the attention of the operator of a following vehicle.

Any suitable source of electricity may be utilized for illuminating the tail and flash lamps and by means of the leads 33 and 33' current is carried to the terminals or binding posts 34 and 34' mounted on casing 4. From these binding posts current passes to the commutator brushes 35 and 36 which are mounted on the inner face of the casing and have their free ends engaging with the contact strips or bands 37, 38 and 39 of the commutator. Each of the commutator strips 37 and 39 are provided with suitable connections 40 and 41 on the ends of which are arranged binding posts from which the wires 43 and 44 lead to the electric lamps and the commutator strip 39 is also provided with a suitable connection 42 on the end of which is arranged a binding post to which the common return wire 45 from the lamps is connected. It will be observed that the commutator strip 39 is interrupted for a portion of its length so that when the arrow is in its normal or upwardly pointing position as indicated, the circuit for illuminating the flash lamp will be broken. Now, immediately upon the arrow being turned either to the right or left the end of the strip 39 will engage with one of the arms of the commutator brush 35 thus making electrical connection so that current will pass from its source through the positive lead 33, binding post 34, one arm of the commutator brush 35, commutator strip 39, connection 41, wire 44, to the flash lamp back through the common return wire 45, connection 42, commutator strip 38, commutator brush 36 and binding post 34' to the negative lead 33' thus completing the circuit from any suitable source which may be in use. When the arrow is returned to its normal position the circuit will be broken and the flash lamp will again be extinguished by means of the interrupted portion of the commutator strip 39.

The constant illumination of the tail lamp is maintained by means of current passing from its suitable source through the positive lead 33, binding post 34, one arm of the commutator brush 35, commutator strip 37, connection 40, wire 43, to the tail lamp back through the common return wire 45, connection 42, commutator strip 38, commutator brush 36 and binding post 34' to the negative lead thus permitting the constant illumination of the tail lamp when the device is in use at night. By means of a transparency 46 located on the right side of the arrow head the tail lamp may be utilized as a means for illuminating the license number plate of the vehicle and for also illuminating the signal terms when the arrow is rotated.

It is desirable to have the rays of light emanating from the rear of both the tail and flash lamps to be of different color and therefore we have provided the rear faces of both the head and tail portions of the arrow with different colored transparencies as indicated at 47 and 48, (see Fig. 3) that at 47 being of a red color and that at 48 of a white or green color.

Now when the driver wants to indicate that he will turn to the right he operates the handle by turning the same to the right one quarter of a revolution which through the cable connection effects the turning of the arrow one quarter of a revolution thus pointing the head of the arrow toward the right; now should the driver desire to indicate that he will stop or turn to the left he will again operate the handle so as to bring the head of the arrow to its respective indicative position.

From the foregoing it will thus be seen that this improved signal device is useful in the day time as well as in the night time; that when it is desired to be used at night time it will only be necessary to switch on the electric current which may be accomplished by the use of a suitable electric switch as indicated at 50 in Fig. 4 and which may be located at any suitable point where it may be within convenient reach of the driver; that when adjusted for use at night time the lamp mounted in the arrow head may be utilized as a tail lamp and that moreover the direction is indicated at night by the illuminating feature and at day by the movements of the arrow.

It is obvious that those skilled in the art may vary the details of construction and arrangement of parts without departing from the spirit of our invention and therefore we do not wish to be limited to such features except as may be required by the claim.

What we claim as new is:—

An electric signal comprising a shaft, an arm mounted upon the shaft, lamps mounted at the opposite ends of the arm, a commutator mounted upon the shaft and having two continuous bands and one interrupted band, means electrically connecting both continuous bands with one lamp whereby said lamp is permanently illuminated, means electrically connecting the other lamp with one of the continuous bands and the interrupted band whereby said lamp is flashed at intervals, brushes connected in an electric circuit and engageable with the bands and means for turning the shaft.

In testimony whereof we affix our signatures in presence of two witnesses.

JOSEPH B. HEALEY.
HENRY E. McKINLEY.

Witnesses:
CHARLES C. BURGIO,
HARRY C. BURGIO.